United States Patent [19]

Sekido et al.

[11] E Re. 31,489

[45] Reissued Jan. 10, 1984

[54] SOLID STATE LITHIUM-IODINE PRIMARY BATTERY

[75] Inventors: Satoshi Sekido, Yawata; Tadashi Sotomura, Kashiwara; Yoshito Ninomiya, Hirakata, all of Japan

[73] Assignee: Matsushita Electric Industrial Co., Ltd., Osaka, Japan

[21] Appl. No.: 301,367

[22] Filed: Sep. 11, 1981

Related U.S. Patent Documents

Reissue of:

[64] Patent No.: 4,148,976
Issued: Apr. 10, 1979
Appl. No.: 922,049
Filed: Jul. 5, 1978

[30] Foreign Application Priority Data

Jul. 7, 1977 [JP] Japan ..... 52/081838
Nov. 10, 1977 [JP] Japan ..... 52/135400

[51] Int. Cl.[3] ..... H01M 6/18

[52] U.S. Cl. ..... 429/191; 429/199; 429/213; 29/623.1

[58] Field of Search ..... 429/191, 199, 213, 201, 429/212, 105

[56] References Cited

U.S. PATENT DOCUMENTS

| | | | |
|---|---|---|---|
| 3,352,720 | 11/1967 | Wilson et al. | 429/213 |
| 3,709,734 | 1/1973 | Liang et al. | 429/191 |
| 3,837,920 | 9/1974 | Liang et al. | 429/191 |
| 4,182,797 | 1/1980 | Kondo et al. | 429/199 |

*Primary Examiner*—Anthony Skapars
*Attorney, Agent, or Firm*—Joseph W. Farley

[57] ABSTRACT

A solid-state primary cell comprising a lithium anode, an iodine cathode containing a charge transfer complex and a solid lithium iodide electrolyte doped with a 1-normal-alkyl-pyridinium iodide. The anode surface can be coated with LiOH or $Li_3N$. The iodine cathode comprises a complex of iodine and 1-normal-alkyl-pyridinium iodide and preferably contains titanium dioxide powder, alumina gel powder or silica gel powder admixed with the complex.

13 Claims, 14 Drawing Figures

SOLID STATE LITHIUM-IODINE PRIMARY BATTERY

Matter enclosed in heavy brackets [ ] appears in the original patent but forms no part of this reissue specification; matter printed in italics indicates the additions made by reissue.

BACKGROUND OF THE INVENTION

This invention relates to solid-state primary batteries comprising a lithium anode, an iodine cathode containing a charge transfer complex and a solid lithium iodide electrolyte doped with a 1-normal-alkyl-pyridinium iodide.

Many of electronic circuits presently used require a power supply which provides an output of high voltage but low current. Generally compact batteries reliably operable for a prolonged period of time are desirable for fulfilling such a requirement.

However, usual primary cells incorporating a liquid electrolyte have serious drawbacks. For example, the liquid electrolyte is liable to leak. This is a fatal drawback when the cell is used in a system in which the leakage of the electrolyte is not permissible if slightest. Another drawback is that they need a separator. The separator used in compact cells will cause internal short-circuiting when broken, while reducing the interior space for accommodating the active cell components.

Efforts have been made to overcome these drawbacks. For instance, research has been directed to the development of non-liquid type cells in which all the cell elements are in solid state. Among the cells of this type heretofore proposed, those with a lithium anode are featured by a high energy density.

The performance of solid-state cells depends largely on the ionic conductivity of the solid electrolyte used. Thus solid-state cells will have a high internal resistance and therefore deliver low output current when containing a solid electrolyte which has such a low conductivity that the electron conductivity of the cathode mixture of the cell is at least 100 to 1000 times as high as the conductivity of the electrolyte.

Liang et al., J. Electrochemical Soc., 123,453 (1976), have proposed a solid-state cell comprising a lithium anode, a cathode mixture of lead iodide and lead sulfide and a solid lithium iodide electrolyte doped with alumina. The solid lithium iodide electrolyte doped with alumina has a relatively high ionic conductivity of about $10^{-5}$ $ohm^{-1}.cm^{-1}$ at 25° C., whereas the discharge reaction product of the cell is lithium iodide having a relatively low ionic conductivity of about $10^{-7}$ $ohm^{-1}.cm^{-1}$ at 25° C.

Schneider et al., J. Power Sources 5,651 (1975), have proposed a solid-state cell comprising a lithium anode, a cathode mixture composed of a charge transfer complex of iodine with poly-2-vinylpyridine containing an excess of iodine, and a solid lithium iodide electrolyte. The electrolyte and discharge reaction product of the cell are both lithium iodide having a relatively low ionic conductivity of about $10^{-7}$ $ohm^{-1}.cm^{-1}$ at 25° C. The cathode mixture which has a relatively low electron conductivity of about $10^{-4}$ $ohm^{-1}.cm^{-1}$ at 25° C. is fully useful as such since the electrolyte used has a still lower conductivity of $10^{-7}$ $ohm^{-1}.cm^{-1}$. The cellnevertheless has the drawback of being unable to deliver a relatively high output current because of the low conductivity of the electrolyte and, moreover, remains to be improved in its shelf life. In fact, when the battery is stored at high temperatures, iodine diffuses markedly from the cathode mixture through the solid electrolyte, possibly draining the cell due to the attendant internal short-circuiting during storage.

SUMMARY OF THE INVENTION

An object of this invention is to provide an improved solid-state cell which has a lithium anode and in which lithium iodide doped with a 1-normal-alkyl-pyridinium iodide having a relatively high ionic conductivity is the solid electrolyte and cell discharge reaction product.

Another object of this invention is to provide an improved solid-state cathode mixture containing iodine and having a relatively high electron conductivity.

Another object of this invention is to provide a solid-state cell which has a lithium anode coated with LiOH or $Li_3N$ and which is thereby rendered less susceptible to internal self-discharge.

The cell of this invention comprises a lithium anode, a solid electron-conductive iodine-containing cathode and a solid lithium iodide electrolyte doped with a 1-alkyl-pyridinium iodide.

The cell reaction is represented by the following equation:

$$C_5H_5NRI_{n+(n-1)}Li \rightarrow C_5H_5NRI(n-1)LiI$$

wherein n is the number of iodine atoms. Since lithium has the smallest electrochemical equivalent and is the most electronegative metal, the electrochemical system has a high energy density of about 425 mWh/cc. The electrolyte resulting from the cell discharge reaction is lithium iodide doped with a 1-normal-alkyl-pyridinium iodide, namely $C_5H_5NR(n-1)LiI$. At 25° C., this lithium salt has an ionic conductivity of $10^{-4}$ $ohm^{-1}.cm^{-1}$ which is much higher than the conductivity, about $10^{-7}$ $ohm^{-1}.cm^{-1}$, of lithium iodide. This electrolyte is formed by the direct surface-to-surface contact of the anode with the cathode. Thus the lithium anode reacts with the charge transfer complex of this invention, forming a solid electrolyte interconnecting the anode and the cathode and comprising lithium iodide doped with the 1-normal-alkyl-pyridinium iodide.

The solid cathode mixture comprises a charge transfer complex of iodine with a 1-normal-alkyl-pyridinium iodide and an iodine-inert electrically nonconductive powder admixed with the complex. Examples of preferable powders are titanium dioxide powder, alumina gel powder and silica gel powder. Generally the cathode mixture is held in contact with a current collector preferably of carbon or metal which is inert to the cathode mixture.

Similarly an inert current collector is used in the usual manner for the soft anode to provide a terminal for electrical connection. The lithium anode may preferably be coated with lithium hydroxide or lithium nitride to mitigate the internal self-discharge of the cell which gradually occurs during storage due to the diffusion of iodine through the electrolyte layer.

The corrosion of the cathode current collector metal by the cathode complex also involves spontaneous internal self-discharge of the cell. When made of super ferrite stainless steel containing at least 30 wt. % of Cr and at least 2 wt. % of Mo, the current collector is highly resistant to corrosion.

Other features and advantages of this invention will become more apparent from the following detailed description with reference to the accompanying drawings.

BRIEF DESCRIPTION OF THE DRAWING FIGURES

DETAILED DESCRIPTION OF THE INVENTION

Briefly, the main object of this invention is to alleviate the problem of high internal resistance attributable to the solid electrolyte and the attendant problem of low output current and to provide novel cells.

Figure 1A:
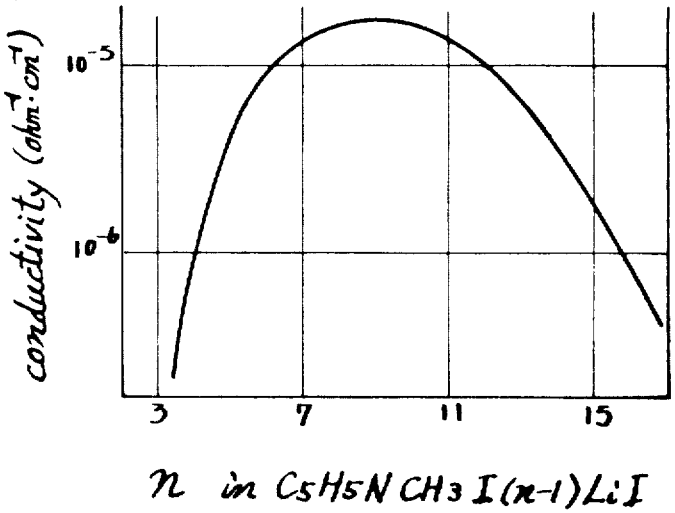
FIGS. 1a to 1c show conductivities at 25° C. of some solid electrolytes of lithium iodide doped with 1-normal-alkyl-pyridinium iodides.
Figure 1B:
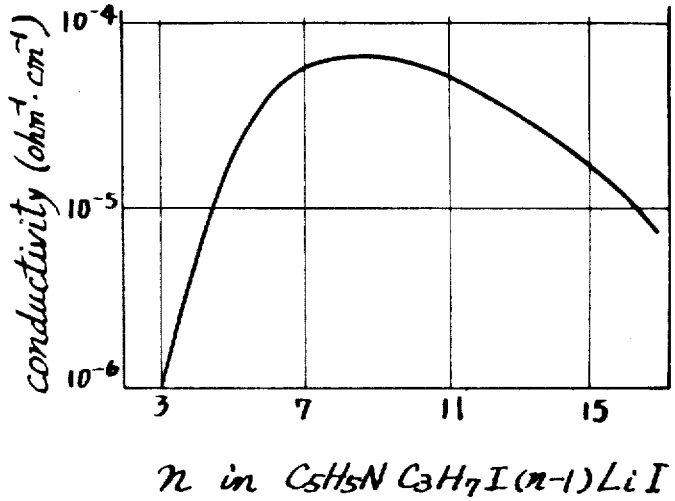
Figure 1C:
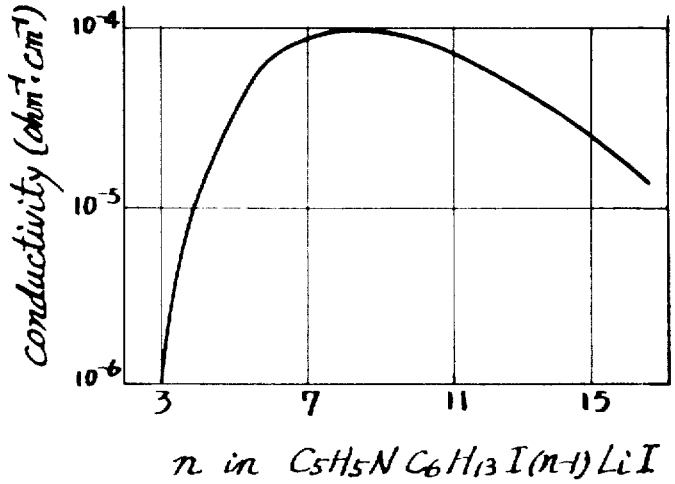

We have found that the conductivity of lithium iodide can be greatly improved by the addition of 1-normal-alkyl-pyridinium iodides which would produce defects in the solid lithium iodide electrolyte matrix. FIG. 1a shows conductivities of lithium iodide doped with 1-methyl-pyridinium iodide ($C_5H_5NCH_3I(n-1)LiI$), FIG. 1b shows those of lithium iodide doped with 1-normal-propyl-pyridinium iodide ($C_5H_5NC_3H_7I(n-1)LiI$), and FIG. 1c shows those of lithium iodide doped with 1-normal-hexyl-pyridinium iodide ($C_5H_5NC_6H_{13}I(n-1)LiI$). In these diagrams, the conductivity is plotted as ordinate vs. the number of iodine atoms, n, as abscissa. As will be apparent from FIGS. 1a to 1c, these lithium salts have the highest conductivities when the n value is between 6 and 12. The conductivity increases with the increase in the size of the pyridinium ion added.

The ratio of ionic radii $r^+/r^-$ is theoretically about 0.28. This value indicates that the coordination number of $Li^+$ cation relative to $I^-$ anion is 4, but since the lithium iodide crystal is actually of the sodium chloride type, the coordination number is 6.

The difference in the coordination number between the theoretical value and the actual value means that the apparent radius of $Li^+$ cation is greater than is theoretically thought. This results in the unexpectedly high ionic conductivity of lithium iodide, about $10^{-7}$ $ohm^{-1}.cm^{-1}$.

This is also the case with the addition of a large organic cation to lithium iodide. The addition of a large organic cation such as the pyridinium ion of this invention expands the crystal lattice of lithium iodide, with the coordination number increasing from 6 to 8. This also means an increase in the apparent radius of $Li^+$ cation, leading to an increase in the conductivity of the corresponding lithium salt.

Examples of 1-alkyl-pyridinium iodides useful as additives for doping lithium iodide are preferably 1-normal-propyl-pyridinium iodide, 1-normal-butyl-pyridinium iodide, 1-normal-pentyl-pyridinium iodide and 1-normal-hexyl-pyridinium iodide. These additives give high conductivities of at least $10^{-5}$ $ohm^{-1}.cm^{-1}$ over a wide range of n values. The corresponding lithium salts have a melting point higher than 60° C. which is the upper limit of temperatures at which cells are usually used.

Figure 2:
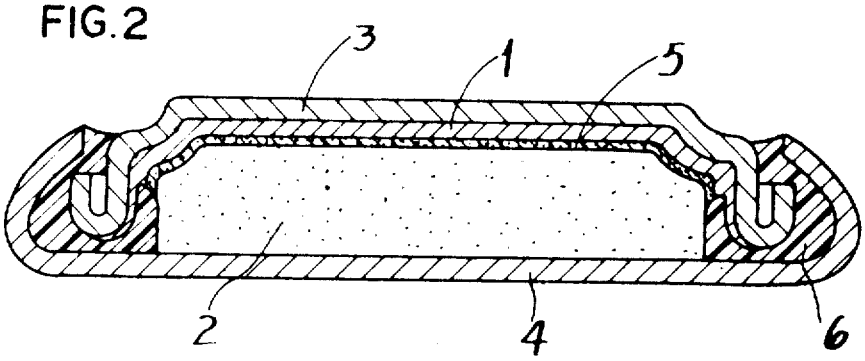
FIG. 2 is a view in vertical section showing a button-shaped cell which is an embodiment of this invention.

FIG. 2 is a sectional view showing a button-shaped cell embodying this invention and having a thickness of 2.5 mm and desired diameter.

Figure 3A:
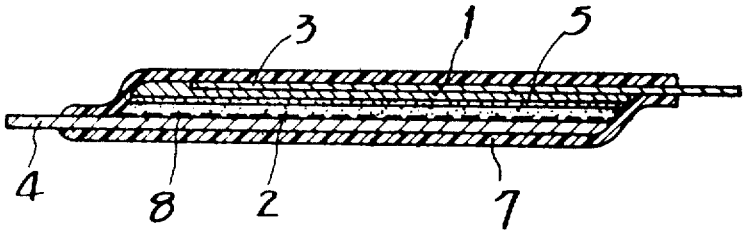
FIG. 3a is a view in vertical section showing a flat-shaped cell which is another embodiment of this invention.
Figure 3B:
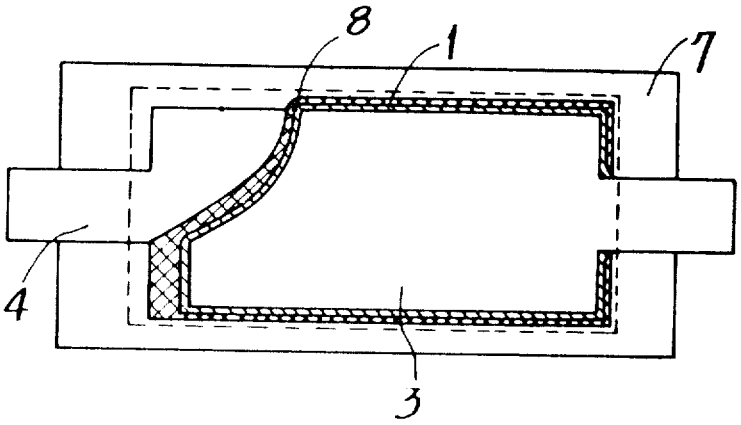
FIG. 3b is a plan view partly broken away and showing the same.
Figure 4A:
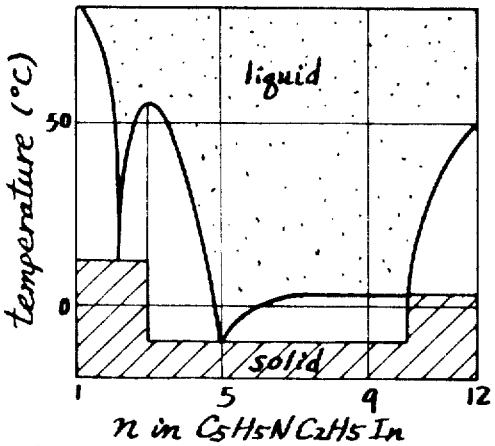
FIGS. 4a to 4e are diagrams illustrating the states of charge transfer complexes of iodine and 1-normal alkyl-pyridinium iodides useful in this invention.
Figure 4B:
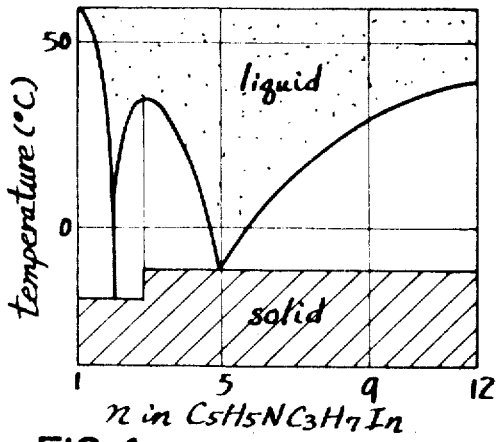
Figure 4C:
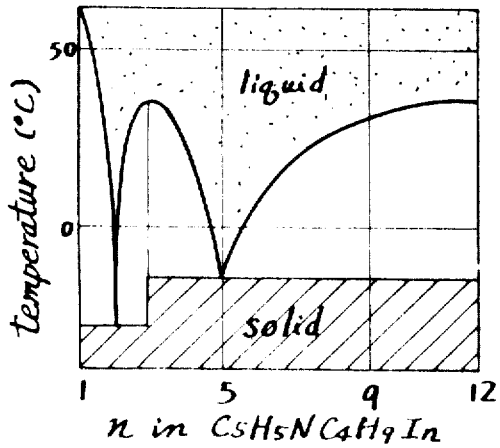
Figure 4D:
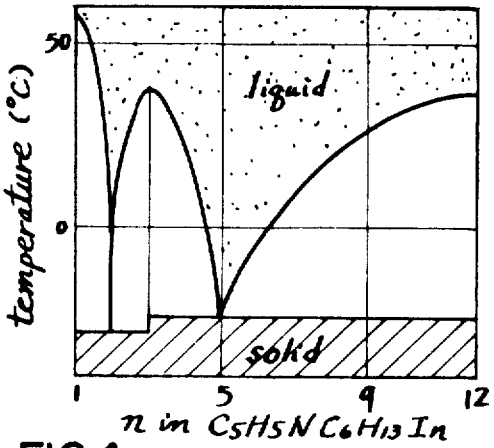
Figure 4E:
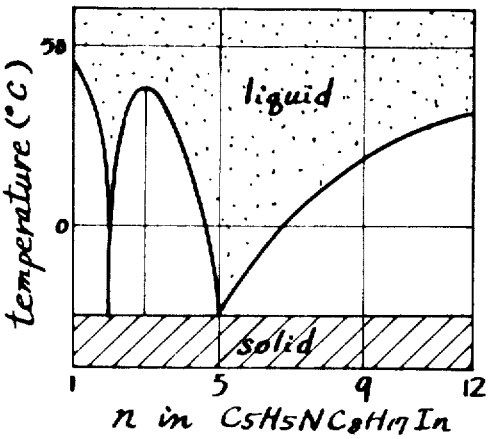

FIGS. 3a and 3b are a sectional view and a plan view showing a flat-shaped cell which is another embodiment of this invention and measuring 1.5 mm in thickness, 52 mm in length and 25 mm in width.

The button-shaped cell comprises a 0.2-mm-thick lithium anode 1 having one side in contact with an anode current collector 3 made of metal and serving also as a closure plate and the other side in contact with an iodine-containing cathode mixture 2, a thin layer 5 of solid lithium iodide electrolyte formed on the surface of the lithium anode 1 by the contact of the lithium anode 1 with the cathode mixture 2 and doped with a 1-normal-alkyl-pyridinium iodide, a cathode current collector 4 serving also as the shell of the cell and made of super ferrite stainless steel containing at least 30 wt. % of Cr and at least 2 wt. % of Mo, and a plastics insulator 6 for electrically insulating the cathode current collector 4 from the anode current collector 3. The flat-shaped cell includes the same components as above and further comprises a plastics sheet 7 sealing the assembly of these components on the four sides as by heat adhesion. The lithium anode 1 which is usually prepared from a sheet or foil may alternatively be formed on the current collector 3 by vacuum evaporation, electrodeposition or some other usual method. Since the cell of this invention is affected by the water contained in the atmosphere, it is assembled and sealed in a dry box or the like which is maintained at a relative humidity of up to 2% with use of a drying agent such as $P_2O_5$.

When assembling the cell, it is critical to avoid contact between the anode current collector and the cathode mixture which would cause internal short-circuiting. Insofar as is presently known, the electronically conductive material which, when brought into direct contact with the iodine cathode mixture of this invention, forms an ionically conductive, electronically non-conductive film on the surface of the material exposed to the cathode mixture is limited to lithium metal, while the other conductive materials usable for the anode current collector are all electronically connected to the cathode mixture when brought into contact therewith. To avoid such connection in the cells shown in FIGS. 2, 3a and 3b, the anode current collector is fully covered with the lithium anode, the outer periphery of which is held between the plastics insulator and the anode current collector to keep the cathode mixture out of contact with the anode current collector.

It is also critical that the material used for the cathode current collector be resistant to iodine contained in the cathode mixture according to this invention and having high corrosive effect on metals. To select suitable materials for the cathode current collector, we immersed metal materials in a charge transfer complex $C_5H_5NC_2H_5I_{15}$ at 60° C. for a prolonged period and tested them for corrosion resistance in terms of the resulting weight reduction (wt. %). The metal materials tested were iron, SUS304 stainless steel, titanium and Fe(66 wt. %)-Cr(31 wt. %)-MO(3 wt. %) and Fe(68 wt. %)-Cr(30 wt. %)-Mo(2 wt. %) super ferrite stainless steels. Table 1 shows the results, which indicate that the super ferrite stainless steels containing at least 30 wt. % of Cr and at least 2 wt. % of Mo are most resistant to corrosion.

TABLE 1

| Test Specimen | Weight reduction (wt. %) | | |
|---|---|---|---|
| | In 50 days | In 100 days | In 150 days |
| Fe | disappeared | disappeared | disappeared |
| SUS 304 | 21 | 41 | 63 |
| Ti | 16 | 30 | 38 |
| Fe(66)—Cr(31)—Mo(3) | 3 | 3.5 | 3.5 |
| Fe(68)—Cr(30)—Mo(2) | 4 | 4 | 4 |

To select suitable insulators for electrically insulating the cathode current collector from the anode current collector, we immersed various plastic materials in charge transfer complex $C_5H_5NC_2H_5I_{15}$ at 60° C. for a long period and measured the time dependence of resistivity of the plastic films. Insulators are required to have high resistivity if contacting with a charge transfer complex. The plastics tested were polystyrene, polypropylene, polyester, polyvinylchlorid, polyethylene, polyimide and copolymer of ethylene and tetrafluoroethylene.

Table 2 shows the results, which indicate that copolymer of ethylene and tetrafluoroethylene, polypropylene, polyethylene and polyimide are suitable plastics for insulator.

TABLE 2

| Test Specimen | Resistivity ohm.cm | | | |
|---|---|---|---|---|
| | Before immersing | After 10 days | After 30 days | After 100 days |
| Polystyrene | $10^{16}$ | disappeared | disappeared | disappeared |
| Polyester | $10^{14}$ | broken | disappeared | disappeared |
| Polyvinylchlorid | $10^{15}$ | $10^{11}$ | $10^{10}$ | $10^{10}$ |
| Polyethylene | $10^{15}$ | $10^{14}$ | $10^{14}$ | $10^{14}$ |
| Polypropylene | $10^{15}$ | $10^{14}$ | $10^{14}$ | $10^{14}$ |
| Polyimide | $10^{17}$ | $10^{16}$ | $10^{16}$ | $10^{16}$ |
| Complex of | $10^{17}$ | $10^{17}$ | $10^{17}$ | $10^{17}$ |

TABLE 2-continued

| Test Specimen | Resistivity ohm.cm | | | |
|---|---|---|---|---|
| | Before immersing | After 10 days | After 30 days | After 100 days |
| E & TFE | | | | |

FIGS. 4a to 4e are diagrams showing the states of some charge transfer complexes useful as cathode mixtures according to this invention.

It is well known that the charge transfer complex is a substance consisting of two elements, namely an electron acceptor and an electron doner, and having a higher electron conductivity.

The charge transfer complexes suitable for use in this invention are ionic complexes composed of iodine ion serving as the electron doner and iodine serving as the electron acceptor.

The charge transfer complexes of this invention have an electron conductivity of at least about $10^{-2}$ $ohm^{-1}.cm^{-1}$ at room temperature when in a liquid state and also when present in both liquid and solid states. They have an electron conductivity of about $10^{-8}$ $ohm^{-1}.cm^{-1}$ when in a solid state. Such a complex is readily available by mixing together iodine and a 1-normal-alkyl-pyridinium iodide in the dry box already mentioned.

The cathode mixture, which is brought into direct contact with the lithium anode when assembling the battery, must be made completely free from any electron conductive material other than the charge transfer complex. Since the charge transfer complex solidifies and has a reduced electron conductivity at lower temperatures, the temperature at which the cell is usable is limited by the temperature at which the complex completely solidifies. To obtain cells which are usable at temperatures which are much lower than 0° C., for example −15° C., it is preferable to use as the electron donor of the charge transfer complex a 1-normal-alkyl-pyridinium iodide in which the alkyl has at least 3 carbon chains as will be apparent from FIGS. 4a to 4e.

The cathode mixture is composed of the above-mentioned charge transfer complex in a liquid state and having a high electronic conductivity and an iodine-inert electrically nonconductive powder preferably of titanium dioxide, alumina gel or silica gel admixed with the complex, the mixture being in the form of a solid powder having a high electronic conductivity. The proportion of the inert nonconconductive powder relative to iodine is so determined that the cathode mixture is press-moldable to pellets which effectively retain the liquid charge transfer complex against flowing out and which have an electronic conductivity of at least $10^{-2}$ $ohm^{-1}.cm^{-1}$.

Various pellets were press-molded from iodine, 1-normal-butyl-pyridinium iodide and silica gel powder up to 10 μm in particle size and adapted for use in chromatographic analysis. Table 3 shows the bulk densities (d; gr/cc at 25° C.) of the pelletized cathode mixture capable of positively retaining the charge transfer complex and the conductivities ($\sigma_e$, $ohm^{-1}.cm^{-1}$) thereof.

TABLE 3

| $SiO_2$ gel content (wt. %) | n in $C_5H_5N.C_4H_9I_n$ | | | | | | |
|---|---|---|---|---|---|---|---|
| | 3 | 5 | 6 | 9 | 12 | 15 | 27 |
| d | 2.6 | 3.0 | 2.8 | 2.6 | 2.8 | 3.2 | 3.4 |
| $\sigma_e$ | $1.1 \times 10^{-2}$ | $1.9 \times 10^{-2}$ | $2.1 \times 10^{-2}$ | $3.8 \times 10^{-2}$ | $1.9 \times 10^{-2}$ | $1.5 \times 10^{-2}$ | $4.2 \times 10^{-3}$ |

TABLE 3-continued

| $SiO_2$ gel content (wt. %) | n in $C_5H_5N.C_4H_9I_n$ | | | | | | |
|---|---|---|---|---|---|---|---|
| | 3 | 5 | 6 | 9 | 12 | 15 | 27 |
| d | 2.4 | 2.8 | 2.6 | 2.5 | 2.7 | 3.0 | 3.1 |
| $\sigma_e$ | $1 \times 10^{-2}$ | $1.8 \times 10^{-2}$ | $1.9 \times 10^{-2}$ | $3.5 \times 10^{-2}$ | $1.6 \times 10^{-2}$ | $1.5 \times 10^{-2}$ | $2.0 \times 10^{-3}$ |
| d | 2.3 | 2.6 | 2.5 | 2.3 | 2.5 | 2.8 | 3.0 |
| $\sigma_e$ | $8 \times 10^{-3}$ | $1.1 \times 10^{-2}$ | $1.6 \times 10^{-2}$ | $2.0 \times 10^{-2}$ | $1.4 \times 10^{-2}$ | $1 \times 10^{-2}$ | $1.5 \times 10^{-3}$ |
| d | 2.2 | 2.5 | 2.3 | 2.1 | 2.3 | 2.5 | 2.8 |
| $\sigma_e$ | $2.6 \times 10^{-3}$ | $9 \times 10^{-3}$ | $1.3 \times 10^{-2}$ | $1.8 \times 10^{-2}$ | $9 \times 10^{-3}$ | $8.5 \times 10^{-3}$ | $9 \times 10^{-4}$ |

The voltage of the cell of this invention linearly lowers with the lapse of time when the cell is discharged at a constant current. Generally the curve representing the voltage-time relation during the discharge of the cell is given by:

$$V_T = Vemf - \{Ro \cdot i/s + R(i/s)^2 t\}$$

wherein $V_T$ is the voltage of the cell, Vemf is the electromotive force of the cell, i is the discharge current value, s is the area of the lithium anode, Ro is the internal resistance value of the cell due to the growth of electrolyte layer during storage of the cell and R is the internal resistance value resulting from the formation of electrolyte due to the discharge.

The value Ro depends on the square root of storage time as is typical of the diffusion limit reaction. The increase in Ro can be inhibited perfectly or partially by covering the surface of the lithium anode with a lithium hydroxide layer or lithium nitride layer. Since the lithium hydroxide or lithium nitride remains thermodynamically relatively stable against the attack by the iodine of the cathode, such a layer inhibits the diffusion of iodine from the cathode. What is more advantageous is that the thin layer of lithium nitride which is highly lithium-ion conductive will produce no adverse effect on the cell during discharge. Lithium hydroxide, although nonconductive for lithium ions, will coat the lithium anode in the form of a porous thin layer and further gradually react with the iodine from the cathode to form lithium iodide monohydrate which is more lithium-ion conductive than lithium iodide. Similarly, therefore, lithium hydroxide will in no way act adversely on the cell during discharge.

The cells of this invention will be described below in greater detail with reference to examples.

EXAMPLE 1

Cells incorporating a lithium anode and a solid electrolyte of the construction shown in FIGS. 3a and 3b were assembled with use of four kinds of cathode mixtures, namely a mixture of $C_5H_5N.C_4H_9I_9$ or $C_5H_5N.C_4H_9I_{50}$ charge transfer complex and silica gel powder up to 10 μm in particle size and adapted for use in chromatographic analysis, a mixture of $C_5H_5N.C_4H_9I_9$ and alumina gel powder up to 10 μm in particle size and adapted for use in chromatogrphic analysis, a mixture of $C_5H_5N.C_4H_9I_9$ and titanium dioxide powder up to 10 μm in particle size, and a poly-2-vinylpyridine charge transfer complex having 10 iodine atoms per nitrogen atom. The group $C_4H_9$ is a normal-butyl, i.e. normal—$C_4H_9$.

With reference to FIGS. 3a and 3b, each of the cells was assembled with use of a 0.1-mm-thick cathode current collector 4 made of super ferrite stainless steel containing at least 30 wt. % of Cr and at least 2 wt. % of Mo. A piece of polypropylene nonwoven fabric, 1 mm in thickness, 22 mm in width and 50 mm in length and serving to insulate the cathode collector from the anode, was placed over the collector 4, with the above-mentioned cathode mixture placed on the fabric over an area, smaller than the surface area of the fabric, of 18 mm in width and 40 mm in length. The assembly was molded at pressure of 0.2 t/cm$^2$ to form a cathode mixture layer of about 1 mm in thickness. An anode current collector 3 supporting a lithium anode having a smaller area than the nonwoven fabric and measuring 20 mm in width, 45 mm in length and 0.2 mm in thickness was thereafter superposed on the molded cathode layer. The assembly was sealed with about 0.1 -mm-thick polypropylene film to prepare a flat-shaped cell.

Figure 5:
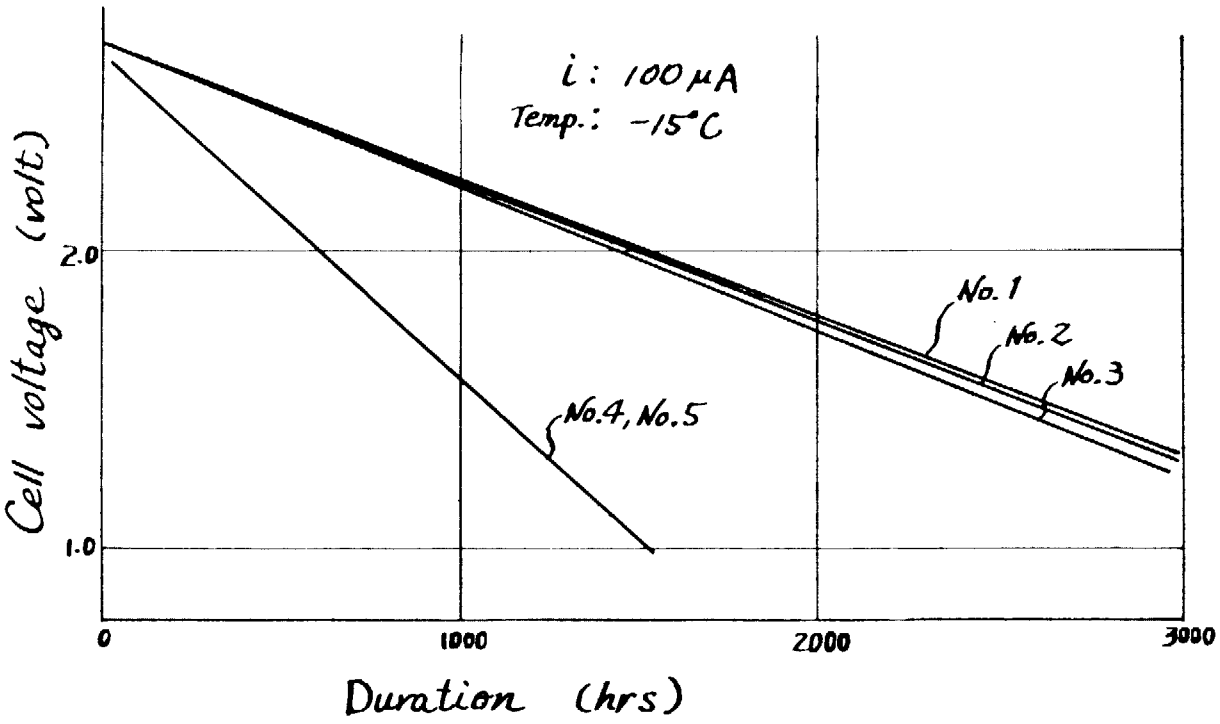
FIG. 5 is a diagram showing the discharge curves of the cells prepared in Example 1 as determined by the discharge of constant current of 100 $\mu$A at $-15°$ C.

Table 4 shows the electromotive force (O.C.V.) of each of the cells thus prepared, and the internal resistance of the cell measured after storing the cell for 3 months at 25° C. One month after the preparation, the cell was tested at −15° C. for discharge at a constant current of 100 μA. FIG. 5 showing the discharge curve thus obtained reveals that the cells of this invention can deliver a greater amount of current than the conventional cell in which the electrolyte is lithium iodide and the cathode mixture is a charge transfer complex of iodine and poly-2-vinylpryidine.

TABLE 4

| Cell No. | Cathode mixture | O.C.V. (volts) | Internal resistance (Ω) after 3 months at 25° C. |
|---|---|---|---|
| 1 | $C_5H_5N.C_4H_9I_9$ + $SiO_2$ gel (17 wt. %) | 2.79 | 250 |
| 2 | $C_5H_5N.C_4H_9I_9$ + $Al_2O_3$ gel (20 wt. %) | 2.80 | 320 |
| 3 | $C_5H_5N.C_4H_9I_9$ + $TiO_2$ (25 wt. %) | 2.79 | 290 |
| 4 | $C_5H_5N.C_4H_9I_{50}$ + $SiO_2$ gel (5 wt. %) | 2.80 | 1800 |
| 5 | poly-2-vinylpyridine $I_{10}$ | 2.81 | 1750 |

EXAMPLE 2

Cells, 11.6 mm in diameter and 2.5 mm in thickness, of the construction shown in FIG. 2 and comprising a lithium anode and a solid electrolyte were prepared with use of a cathode mixture of $C_5H_5N$-normal-$RI_9$(R:$CH_3$, $C_2H_5$, $C_3H_7$, $C_4H_9$, $C_6H_{13}$ or $C_8H_{17}$) charge transfer complex and silica gel powder up to 10 μm in particle size and adapted for use in chromatographic analysis. The cathode mixture was prepared by mixing together the specified amount of $C_5H_5N$-normal-$RI_9$ powder, iodine powder and silica gel powder, and molding the mixture into pellets of 8.6 mm in diameter and about 1.7 mm in thickness at pressure of 0.2 ton/cm$^2$. The pellets were placed on a 0.3-mm-thick stainless steel closure plate serving also as an anode current collector 3 and provided with a 0.2-mm-thick lithium sheet 1 and a polypropylene insulator 6 as shown in FIG. 2. A 0.3-mm-thick cathode current collector 4 serving as the shell of the cell and made of stainless steel containing at least 30 wt. % of Cr and at least 2 wt. % of Mo was placed over the resulting assembly. The outer periphery of the cathode current collector 4 was then crimped at pressure of 2 tons/cm$^2$ to complete the cell.

Figure 6:
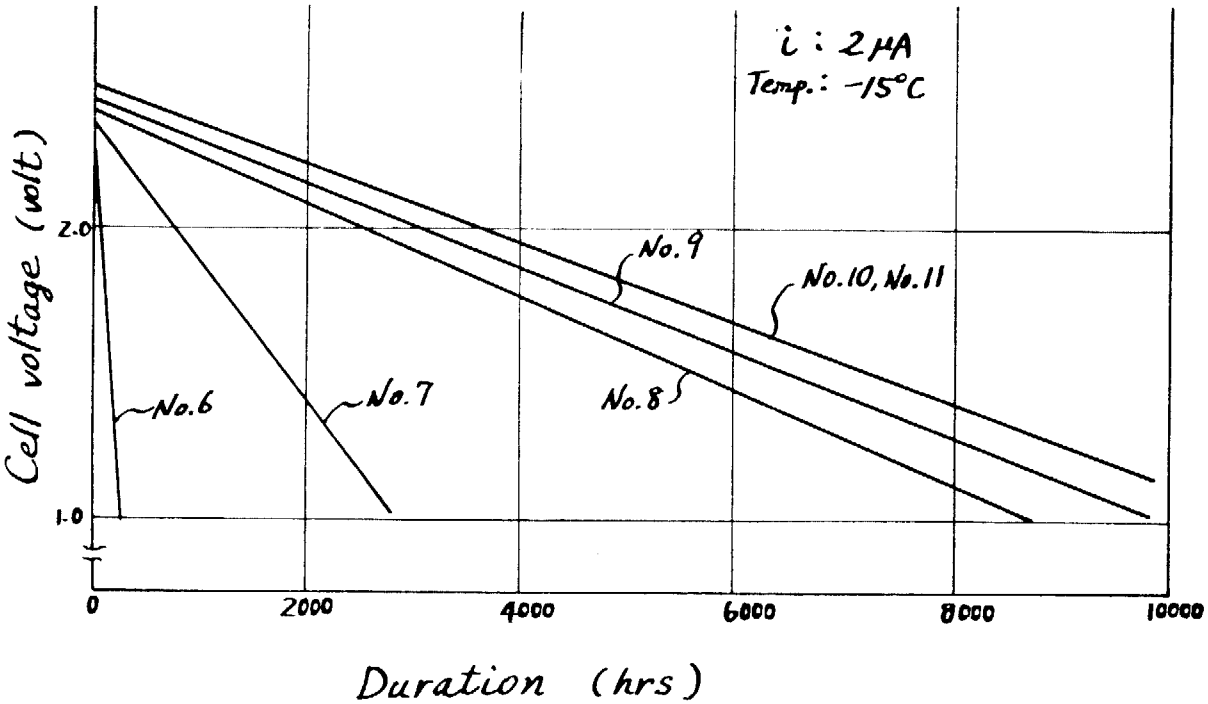
FIG. 6 is a diagram showing the discharge curves of the cells prepared in Example 2 as determined by the discharge of constant current of 2 $\mu$A at $-15°$ C.
Figure 7:
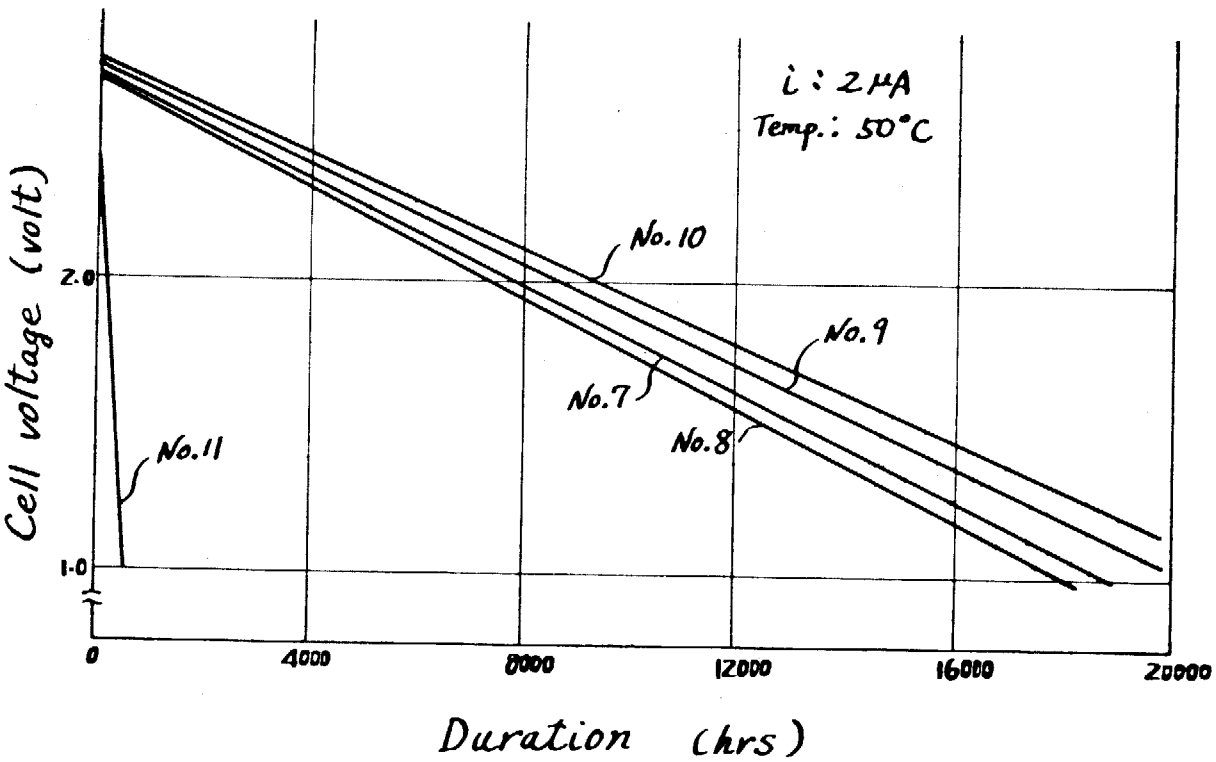
FIG. 7 is a diagram showing the discharge curves of cells prepared in Example 2 as determined by the discharge of constant current of 2 $\mu$A at 50° C.

Table 5 shows the electromotive force (O.C.V.) of each of the button-shaped cells thus prepared, and the internal resistance of the cell measured after storing the cell for 3 months at 25° C. One month after the preparation, the cells were tested at −15° C. for discharge at a constant current of 2 μA to obtain the discharge curves shown in FIG. 6 and were similarly tested at 50° C. to obtain the discharge curves shown in FIG. 7. FIGS. 6 and 7 indicate that the cells in which the charge transfer complexes having alkyl of 3 to 6 carbon chains are used as the cathode mixture exhibit outstanding discharge performance over a wide temperature range.

TABLE 5

| Cell No. | Cathode mixture | O.C.V. (volts) | Internal resistance (kΩ) after 3 months at 25° C. |
|---|---|---|---|
| 6 | $C_5H_5N.CH_3I_9$ + $SiO_2$ gel (2 wt. %) | 2.80 | 12 |
| 7 | $C_5H_5N.C_2H_5I_9$ + $SiO_2$ gel (17 wt. %) | $2.79_5$ | 8.3 |
| 8 | $C_5H_5N.C_3H_7I_9$ + $SiO_2$ gel (17 wt. %) | $2.79_5$ | 4.1 |
| 9 | $C_5H_5N.C_4H_9I_9$ + $SiO_2$ gel (17 wt. %) | 2.79 | 4.2 |
| 10 | $C_5H_5N.C_6H_{13}I_9$ + $SiO_2$ gel (17 wt. %) | 2.79 | 3.9 |
| 11 | $C_5H_5N.C_8H_{17}I_9$ + $SiO_2$ gel (17 wt. %) | $2.78_5$ | 3.6 |

EXAMPLE 3

Cells, 23 mm in diameter and 2.5 mm in thickness, of the construction shown in FIG. 2 and comprising a lithium anode and a solid electrolyte were prepared with use of a cathode mixture of $C_5H_5N$-normal-$C_4H_9I_n$ (n: 3, 5, 6, 9, 12, 27 or 50) charge transfer complex and silica gel powder up to 10 μm in particle size and adapted for use in chromatographic analysis. The cells were prepared in the same manner as in Example 2 except that the cathode mixture was molded into pellets of 18 mm in diameter and about 1.7 mm in thickness.

Figure 8:
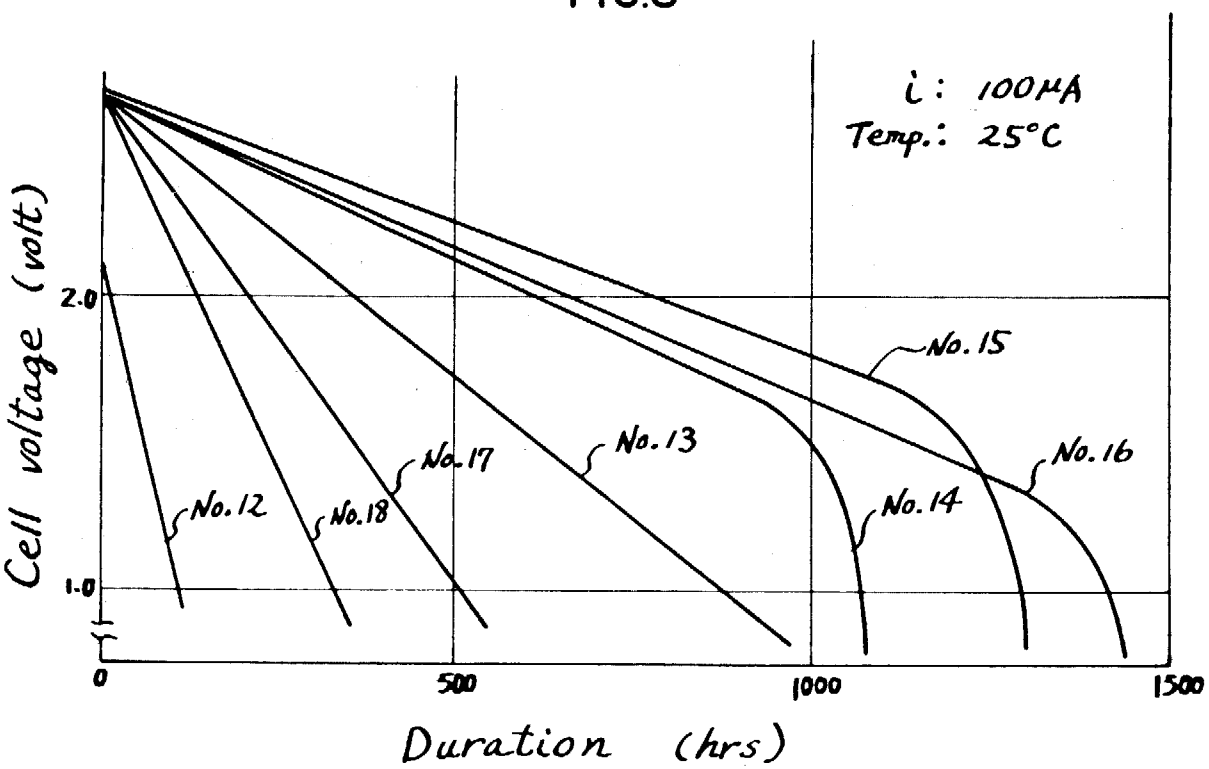
FIG. 8 is a diagram showing the discharge curves of the cells prepared in Example 3 as determined by the discharge of constant current of 100 $\mu$A at 25° C.

Table 6 shows the electromotive force (O.C.V.) of each of the button-shaped cells thus prepared, and the internal resistance of the cell measured after storing the cell for 3 months at 25° C. One month after the preparation, the cells were tested at 25° C. for discharge at a constant current of 100 μA to obtain the discharge curves shown in FIG. 8. The results indicate that the cells in which the charge transfer complexes of this invention have an n value of 6 to 12 exhibit outstanding discharge performance, as can be expected from FIG. 1 showing ionic conductivities of lithium iodide doped with 1-alkyl-pyridinium iodides.

TABLE 6

| Cell No. | Cathode mixture | O.C.V. (volts) | Internal resistance (Ω) after 3 months at 25° C. |
|---|---|---|---|
| 12 | $C_5H_5N.C_4H_9I_3$ + $SiO_2$ gel (10 wt. %) | 2.46 | 3520 |
| 13 | $C_5H_5N.C_4H_9I_5$ + $SiO_2$ gel (15 wt. %) | 2.75 | 1050 |
| 14 | $C_5H_5N.C_4H_9I_6$ + $SiO_2$ gel (15 wt. %) | 2.77 | 810 |
| 15 | $C_5H_5N.C_4H_9I_9$ + $SiO_2$ gel (17 wt. %) | 2.79 | 790 |
| 16 | $C_5H_5N.C_4H_9I_{12}$ + $SiO_2$ gel (20 wt. %) | 2.80 | 850 |
| 17 | $C_5H_5N.C_4H_9I_{27}$ + $SiO_2$ gel (15 wt. %) | $2.80_5$ | 1980 |
| 18 | $C_5H_5N.C_4H_9I_{50}$ + $SiO_2$ gel (5 wt. %) | 2.80 | 5200 |

EXAMPLE 4

The increase in the internal resistance Ro of cells during the storage particularly at high temperatures is attributable to the growth of the electrolyte during the storage and is one of the factors governing the discharge voltage of the cell. The increase of the resistance Ro can be effectively inhibited by coating the lithium anode with a thin layer of lithium hydroxide over the anode surface to be brought into contact with the cathode mixture, although this requires an additional procedure when assembling the cell.

Cells, 11.6 mm in diameter and 2.5 mm in thickness, of the construction shown in FIG. 2 were prepared which incorporated a lithium anode coated with lithium hydroxide and a solid electrolyte.

Figure 9A:
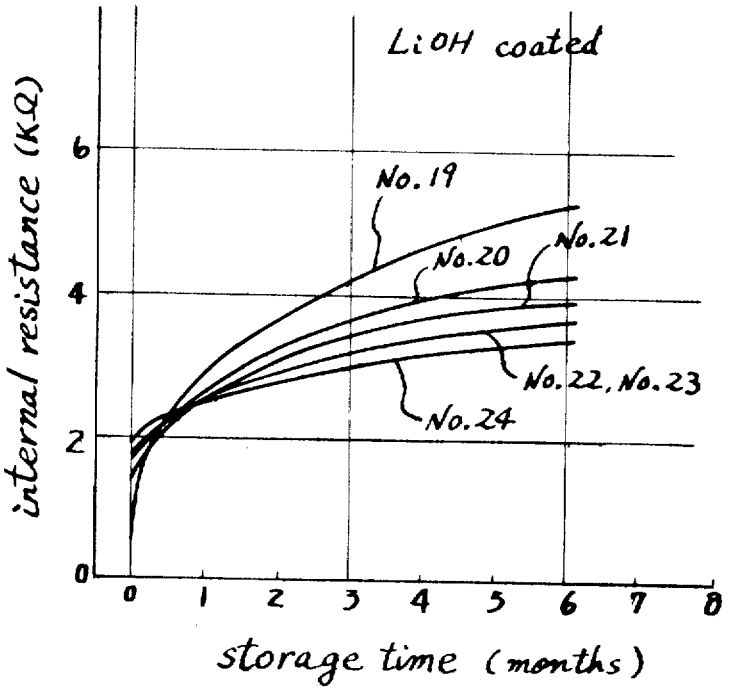
FIGS. 9a and 9b are diagrams showing veriations in the internal resistance of the cells prepared in Examples 4 and 5 as determined when the cells were stored at 60° C. for a prolonged period of time.

The lithium hydroxide layer was formed by placing a lithium anode 1 in the recess of an anode current collector 3 serving also as a closure plate and fitting a plastics insulator 6 over the peripheral portion of the assembly to obtain an anode module, and allowing the anode module to stand for about 0.5 minute in a closed container maintained at a relative humidity of 11% at 20° C. with a saturated aqueous solution of lithium chloride. Except for this procedure, the cells were made in the same manner as in Example 2. Table 7 shows the electromotive force (O.C.V.) of the button-shaped cells thus prepared. FIG. 9a shows variations in the internal resistance of the cells during storage at 60° C., as determined from the cell voltage drop resulting from the application of direct current for 1 to 2 seconds.

TABLE 7

| Cell No. | Cathode mixture | Exposure to $H_2O$ vapor (time in min.) | O.C.V. (volts) |
|---|---|---|---|
| 19 | $C_5H_5N.C_4H_9I_{12}$ + $SiO_2$ gel (20 wt. %) | 0 | 2.80 |
| 20 | $C_5H_5N.C_3H_7I_9$ + $SiO_2$ gel (17 wt. %) | 0.5 | 2.86 |
| 21 | $C_5H_5N.C_4H_9I_{12}$ + $SiO_2$ gel (20 wt. %) | 0.5 | 2.91 |
| 22 | $C_5H_5N.C_4H_9I_9$ + $SiO_2$ gel (17 wt. %) | 0.5 | 2.87 |
| 23 | $C_5H_5N.C_4H_9I_6$ + $SiO_2$ gel (15 wt. %) | 0.5 | 2.90 |

TABLE 7-continued

| Cell No. | Cathode mixture | Exposure to $H_2O$ vapor (time in min.) | O.C.V. (volts) |
|---|---|---|---|
| 24 | $C_5H_5N.C_6H_{13}I_9$ + $SiO_2$ gel (17 wt. %) | 0.5 | 2.85 |

EXAMPLE 5

The increase in the internal resistance of cells during storage at high temperatures can be effectively inhibited by coating the lithium anode surface with a thin layer of lithium nitride instead of lithium hydroxide.

Cells, 11.6 mm in diameter and 2.5 mm in thickness, of the construction shown in FIG. 2 were made which included a lithium anode coated with lithium nitride and a solid electrolyte.

Figure 9B:
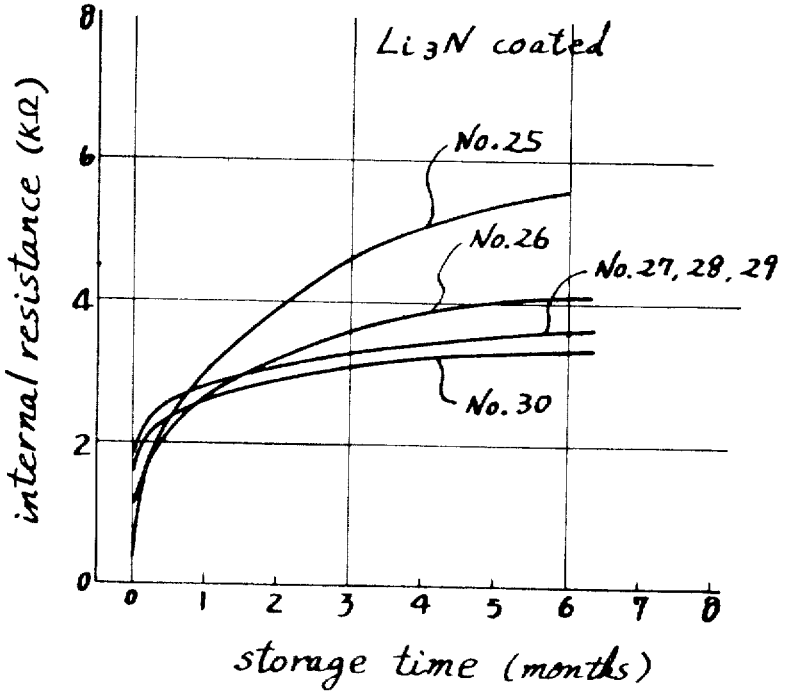

The lithium nitride layer was formed by allowing the same anode module as used in Example 4 to stand for about 45 minutes in a dry container maintained at a temperature of 60° C. with its interior air replaced with nitrogen gas of high purity (99.99%) supplied at a steady rate. Except for this procedure, the cells were made in the same manner as in Example 2. Table 8 shows the electromotive force (O.C.V.) of the button-shaped cells thus obtained. FIG. 9b shows variations in the internal resistance of the cells during storage at 60° C., as determined from the cell voltage drop resulting from the application of direct current for 1 to 2 seconds.

TABLE 8

| Cell No. | Cathode mixture | Exposure to $N_2$ gas (time in min.) | O.C.V. (volts) |
|---|---|---|---|
| 25 | $C_5H_5N.C_4H_9I_{12}$ + $SiO_2$ gel (20 wt. %) | 0 | 2.80 |
| 26 | $C_5H_5N.C_3H_7I_9$ + $SiO_2$ gel (17 wt. %) | 45 | 2.75 |
| 27 | $C_5H_5N.C_4H_9I_{12}$ + $SiO_2$ gel (20 wt. %) | 45 | 2.76 |
| 28 | $C_5H_5N.C_4H_9I_9$ + $SiO_2$ gel (17 wt. %) | 45 | 2.78 |
| 29 | $C_5H_5N.C_4H_9I_6$ + $SiO_2$ gel (15 wt. %) | 45 | 2.78 |
| 30 | $C_5H_5N.C_6H_{13}I_9$ + $SiO_2$ gel (17 wt. %) | 45 | 2.72 |

What we claim is:

1. A substantially anhydrous cell comprising a solid lithium anode, a solid [electronically] *electrically* conductive iodine cathode containing a charge transfer complex of iodine with a 1-normal-alkyl-pyridinium iodide *and an iodine-inert electrically nonconductive powder,* and a solid electrolyte of lithium iodide doped with the 1-normal-alkyl-pyridinium iodide.

2. A cell according to claim 1 in which the anode surface is coated with lithium hydroxide.

3. A cell according to claim 1 in which the anode surface is coated with lithium nitride.

4. A cell according to claim 1, 2 or 3 in which *the* 1-normal-alkyl-pyridinium iodide has an alkyl group of at least three normal carbon chains.

5. A cell according to claim 1, 2 or 3 in which the charge transfer complex contains between 6 and 12 atoms of iodine for each atom of nitrogen.

6. A cell according to claim 1, 2 or 3 in which the [cathode contains an] iodine-inert electrically nonconductive powder *is* selected from the group consisting of titanium dioxide powder, alumina gel powder, and silica gel powder.

7. A cell according to claim 5 in which the cathode is a mixture consisting of the charge transfer complex and *a* silica gel powder.

8. A cell according to claim 7 in which the charge transfer complex has 9 atoms of iodine for each atom of nitrogen of 1-normal-butyl-pyridinium iodide.

9. A cell according to claim 7 in which the cathode contains between 10 and 20 weight percent of the silica gel powder.

10. A cell according to claim 1, 2 or 3 in which the iodine cathode is separated from an anode current collector.

11. A cell according to claim 1, 2 or 3 in which a cathode current collector is made of a super ferrite stainless steel consisting of at least 30 weight percent of Cr, at least 2 weight percent of Mo, and Fe.

[12. A cell according to claim 1, 2 or 3 in which an insulator is made of iodine resistant plastics selected from the group consisting of copolymer of ethylene and tetrafluoroethylene, polypropylene, polyethylene and polyimide.]

13. A process for assembling a cell according to claim 1, 2 or 3 in which the lithium anode surface is directly attached to the iodine cathode.

14. A process for assembling a cell according to claim 1, 2 or 3 in which the lithium anode surface is directly pressed against the iodine cathode.

* * * * *

UNITED STATES PATENT AND TRADEMARK OFFICE

CERTIFICATE OF CORRECTION

PATENT NO. : Re. 31,489

DATED : January 10, 1984

INVENTOR(S) : Satoshi Sekido et al

It is certified that error appears in the above—identified patent and that said Letters Patent is hereby corrected as shown below:

Column 12, after line 54, insert the following claim:

15. A cell according to claim 1 where said electrically nonconductive powder is up to 10 μm in particle size.

Signed and Sealed this

Third Day of July 1984

[SEAL]

Attest:

GERALD J. MOSSINGHOFF

Attesting Officer

Commissioner of Patents and Trademarks